United States Patent [19]
Robinson, Jr.

[11] Patent Number: 4,740,673
[45] Date of Patent: Apr. 26, 1988

[54] DUAL CONTROL THERMOSTAT CIRCUIT

[75] Inventor: Glen P. Robinson, Jr., Atlanta, Ga.

[73] Assignee: E-Tech, Inc., Atlanta, Ga.

[21] Appl. No.: 648,504

[22] Filed: Sep. 10, 1984

[51] Int. Cl.⁴ .............................................. H05B 1/02
[52] U.S. Cl. ..................................... 219/510; 219/279
[58] Field of Search ............... 219/279, 331, 491, 494, 219/510, 508; 62/180, 181, 235.1, 238.6, 324.5; 236/25 R, 20 R, 18, DIG. 6; 237/2 B; 126/351, 374; 165/29, 30, 24, 25

[56] References Cited

U.S. PATENT DOCUMENTS

| | | | |
|---|---|---|---|
| 3,241,603 | 3/1966 | Nagata | 165/29 |
| 3,273,635 | 9/1966 | Jobes | 165/29 |
| 4,190,199 | 2/1980 | Cawley et al. | 165/29 X |
| 4,228,846 | 10/1980 | Smorol | 165/29 X |
| 4,311,190 | 1/1982 | Walley | 219/279 X |
| 4,330,309 | 5/1982 | Robinson, Jr. | 219/279 X |
| 4,385,723 | 5/1983 | Sanborn et al. | 219/279 X |

Primary Examiner—E. A. Goldberg
Assistant Examiner—Marvin M. Lateef
Attorney, Agent, or Firm—B. J. Powell

[57] ABSTRACT

An external circuit that works in conjunction with the existing tank thermostatic controls to control both a heat pump and existing resistance elements in compliance with existing governmental codes. At the same time, this circuit disables the resistive heating elements in the hot water tank and enables the heat pump connected thereto so that the heat pump heats the water in the hot water tank. The control of the operation of the heat pump is provided through the thermostat(s) in the existing tank circuitry in the hot water tank which normally controls the resistive heating elements. At the same time, the electric resistive heating elements remain available for standby use. Further, the circuitry of the invention precludes the simultaneous operation of the electric resistive heating elements in the hot water tank and the heat pump heating unit.

17 Claims, 2 Drawing Sheets

DUAL CONTROL THERMOSTAT CIRCUIT

BACKGROUND OF THE INVENTION

Because fo the better coefficient of performance of heat pumps as compared to electrical resistive heating elements, there has been a movement in recent years to purchase electric resistance hot water heaters and then connect the water heater tank to a heat pump so that the heating was actually performed by the heat pump rather than the electric resistance elements in the water heater itself. This produced a good coefficient of performance while at the same time retained the electric resistance heating elements as a backup so that the hot water may still be obtained in event of failure of the heat pump itself. Such an arrangement is illustrated in my earlier U.S. Pat. No. 4,330,309, granted May 18, 1982.

In order to operate these heat pumps, however, it was necessary that a separate thermostat be placed in a heat transfer relationship with the water in the hot water tank to control the heating cycle of the water heating heat pump. Several proposals to place a thermostat in addition to the thermostat in the existing circuitry for the electric resistive heating elements have been proposed. One such proposal is set forth in my earlier U.S. Pat. No. 4,330,309. Another proposal is set forth in U.S. Pat. No. 4,385,723, issued May 31, 1983, and owned by the same assignee as this application. One of the problems with these types of connections is that many governmental codes preclude the use of additional electrical circuitry within the confines of the hot water heater other than that already approved by Underwriters Laboratory for the existing tank circuitry.

SUMMARY OF THE INVENTION

These and other problems and disadvantages associated with the prior art are overcome by the invention disclosed herein by providing an external circuit that works in conjunctin with the existing tank thermostatic controls to control both the heat pump and the existing resistance elements in compliance with existing governmental codes. At the same time, this circuit disables the resistive heating elements in the hot water tank and enables the heat pump connected thereto so that the heat pump heats the water in the hot water tank. The control of the operation of the heat pump is provided through the thermostat(s) in the existing tank circuitry in the hot water tank which normally controls the resistive heating elements. At the same time, the electric resistive heating elements remain available for standby use. Further, the circuitry of the invention precludes the simultaneous operation of the electric resistive heating elements in the hot water tank and the heat pump heating unit.

The dual control thermostat circuit of the invention includes an impedance which connects the existing tank circuit to line voltage with a sufficiently high impedance to reduce the current flow through the resistive heating elements to the level that substatially prevents the heating capability of the electric resistive heating elements when the existing thermostatic switch in a heat transfer relationship with the water in the hot water tank normally associated with the electrical resistive heating element closes. The dual control circuit also includes an operative element operatively associated with the impedance and responsive to a prescribed voltage drop across the impedance to connect the heat pump circuitry to line voltage to operate the heat pump. Likewise, the dual control circuit of the invention disables the heat pump unit when the voltage across the impedance drops below a prescribed level such as when the thermostatic switch in the existing tank circuitry opens when the hot water in the tank reaches the desired hot water temperature.

It will be appreciated that the control circuit of the invention can be used to automatically control any heating means requiring an electrical resistance heater back-up. For example, the circuit may be used to control the electrical resistance back-up for solar heating systems, heat recovery systems and the like.

These and other features and advantages of the invention will become more clearly understood upon consideration of the following detailed description and accompanying drawings wherein like characters of reference designate corresponding parts throughout the several views and in which:

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
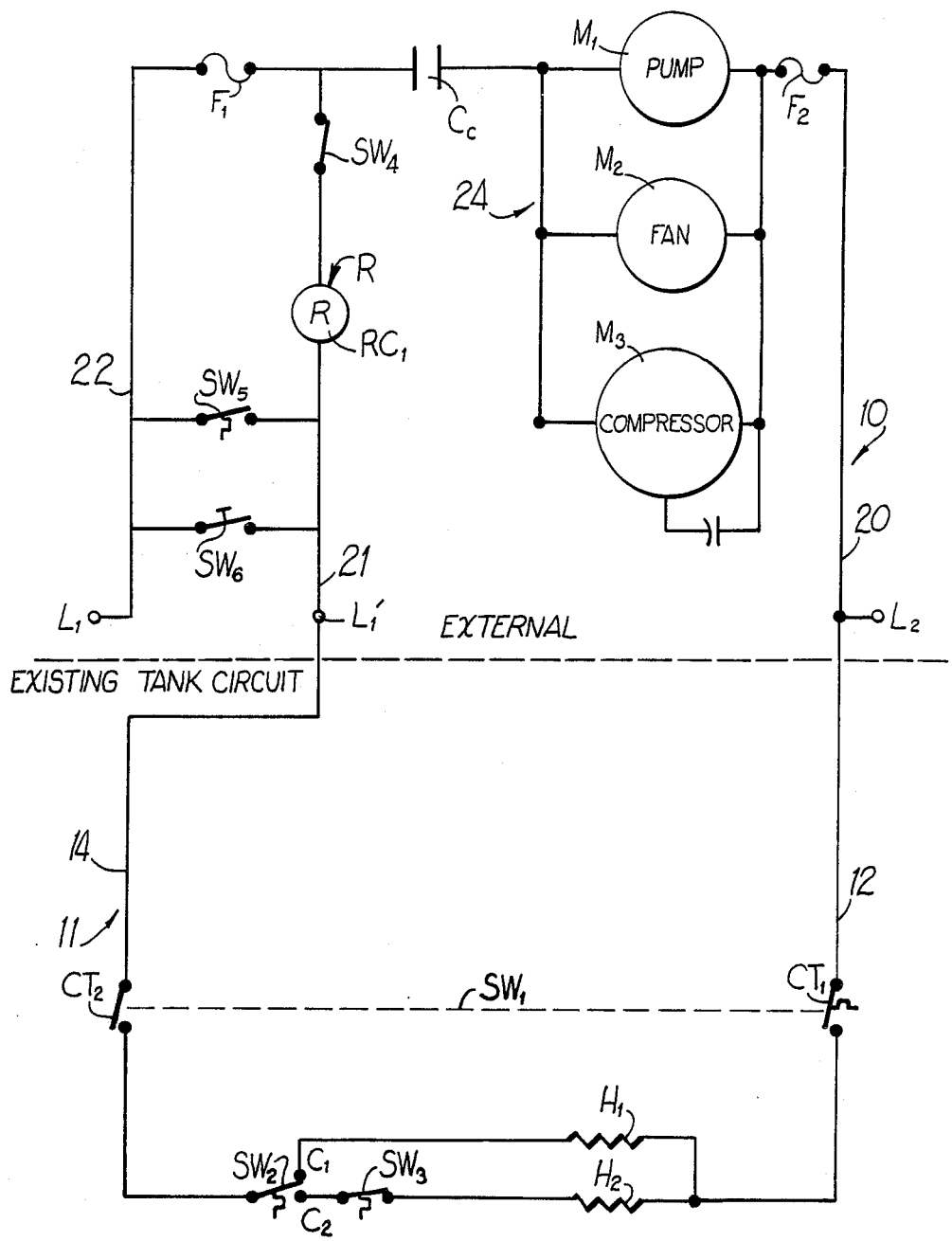
FIG. 1 is an electrical schematic view illustrating the dual control thermostat circuit of the invention shown connected to a conventional dual element electric water heater.

Referring to FIG. 1, it will be seen that the dual control circuit 10 is connected to an existing tank circuit 11. The existing tank circuit 11 includes a conductor 12 which is connected to a terminal $L_2$ adapted to be connected to one side of line voltage. Conductor 12 is connected to one side of the set of contacts $CT_1$ in a double pole single throw (DPST) thermostatically operated switch $SW_1$. The other side of this set of contacts $CT_1$ is connected to one end of both heating elements $H_1$ and $H_2$. The other side of heating element $H_1$ is connected to contact $C_1$ of a single pole double throw (SPDT) thermostatically operated switch $SW_2$. The other side of the heating element $H_2$ is connected to one side of thermostatically operated switch $SW_3$ which in turn is connected to the contact $C_2$ of SPDT switch $SW_2$. The common side of the switch $SW_2$ is connected to one of the other set of contacts $CT_2$ of DPST switch $SW_1$. The other side of this set of contacts $CT_2$ of switch $SW_1$ is connected to conductor 14 which in turn is connected to a terminal $L_1'$ adapted to be connected to the other side of line voltage. Typically, line voltage is 230 volts although different line voltages would work just as well.

The dual control circuit 10 includes wire 20 which is connected to one side of line voltage, typically at terminal $L_2$. The dual control circuit 10 also include wire 21 which is connected to conductor 14 at terminal $L_1'$ in the existing tank circuit 11. Wire 21 is connected to one side of a relay coil $RC_1$ of relay R. The opposite side of the coil $RC_1$ is connected to one side of a high pressure cutout switch $SW_4$ while the other side of the switch $SW_4$ is connected to line voltage at terminal $L_1$ through fuse $F_1$ and wire 22. Switch $SW_4$ is a safety switch which opens to disable the heat pump circuit if the compressor becomes overloaded.

Line voltage at terminal $L_1$ is supplied through fuse $F_1$ and contacts $C_c$ of the relay R to a heat pump circuit 24. The circuit 24 is connected to the line voltage at terminal $L_2$ through fuse $F_2$ and wire 20.

The heat pump circuit 24 includes a water pump motor $M_1$, a fan motor $M_2$ and a compressor motor $M_3$ connected in parallel with each other between the wires 20 and 22 through the contacts $C_c$.

Line voltage at terminal $L_1$ may be connected to wire 21 through either a manually operable switch $SW_6$ or a thermostatic switch $SW_5$ normally open. Switch $SW_5$ closes when the temperature of the environment in which the heat pump is located drops too low for efficient operation of the heat pump. This supplies line voltage directly to the water heater through wires 21 and 14 to allow the electric water heater to operate normally. The manual switch $SW_6$ is also normally open and can be manually closed to supply power directly to the resistance elements of the electric water heater in the event of a malfunction in the heat pump itself. When either switch $SW_5$ or $SW_6$ closes, the heat pump is disabled since coil $RC_1$ is shorted out and contact $C_c$ cannot close.

The tank circuitry 11 operates in conventional manner. The heating elements $H_1$ and $H_2$ are resistance type heaters typically in the 2500-5500 watt range. The switch $SW_2$ is used to prevent smultaneous operation of both heating elements $H_1$ and $H_2$. Typically, the heating element $H_1$ would be located at the top of the tank while the heating element $H_2$ would be located at the bottom of the tank. Switches $SW_1$, $SW_2$ and $SW_3$ are shown in their initial positions that would occur when all of the water in the water tank would be cold. That is, the contact $C_1$ would be closed so that the upper heating element $H_1$ would operate. When the water in the upper part of the tank heated by the heating element $H_1$ reaches a preset temperature, the switch $SW_2$ transfers from contacts $C_1$ to disable the heating element $H_1$ to contact $C_1$ to enable the thermostatic switch $SW_3$ mounted near the bottom of the tank and to enable the heating element $H_2$ so that the water in the lower portion of the tank will be heated. The switch $SW_1$ is a high temperature limit safety device usually set to open at about 180° F. The switches $SW_2$ and $SW_3$ are typical thermostatic switches found in the circuitry of typical electric water heaters in which the set points can be changed.

OPERATION

The resistance of the relay coil $RC_1$ is selected so that the current flow therethrough required to operate the relay will be minimal when line voltage is imposed across it. In the particular example, the relay R is selected with a 10 watt coil which allows a current flow of about 1/20 amp when 230 volts is imposed across it. Typically, the current flow through an existing tank circuit to cause the heating elements $H_1$ and $H_2$ to heat produces current flow in the neighborhood of 10-25 amps. Thus, it will be seen that when relay coil $RC_1$ is connected in series with either resistance elements $H_1$ or $H_2$ as described below, there will very minimal current flow through resistance heating elements $H_1$ and $H_2$ so that negligible heat is generated in the water but there will be sufficient current flow to operate relay R.

It will be seen that when either switch $SW_2$ or $SW_3$ senses a cold tank, line voltage is applied across the relay coil $RC_1$ in series with the low resistance of heating elements $H_1$ or $H_2$ and energize the heat pump circuit 24 and operate the heat pump heating unit to heat the water in the hot water tank. When the temperature of the water in the tank reaches the high set point of the thermostatic switches $SW_2$ and $SW_3$, in which case contact $C_2$ of switch $SW_2$ will be closed and switch $SW_3$ will be open, the entire circuit 11 will be open which will de-energize relay R to open the contacts $C_c$ and de-energize the heat pump circuit 24. When either switch $SW_5$ or $SW_6$ is closed, it will be seen that no voltage can be imposed across the relay coil $RC_1$ since it is shorted out and cannot operate to close the contacts $C_c$ thus placing the heat pump circuit 24 in a disabled condition. At the same time, switches $SW_5$ and $SW_6$ supply line voltage to the resistance elements of the water heater when either switch $SW_2$ is in position $C_1$ or $SW_3$ is closed. Thermostatic switch $SW_5$ typically closes when the ambient air falls below 45° F. when the efficiency of the heat pumps is low. Disabling the heat pumps at this point also prevents frosting of the evaporator coil. Manual switch $SW_6$ is used to energize the resistance elements of the electric water heater in case of a malfunction of the heat pumps.

It will be appreciated that the control circuit 10 can be used to disable any device which can be disabled by the inclusion of a high impedance in the existing device power circuit. Further, the operation of the control circuit 10 is not dependent on the particular components seen in FIG. 1.

Figure 2:
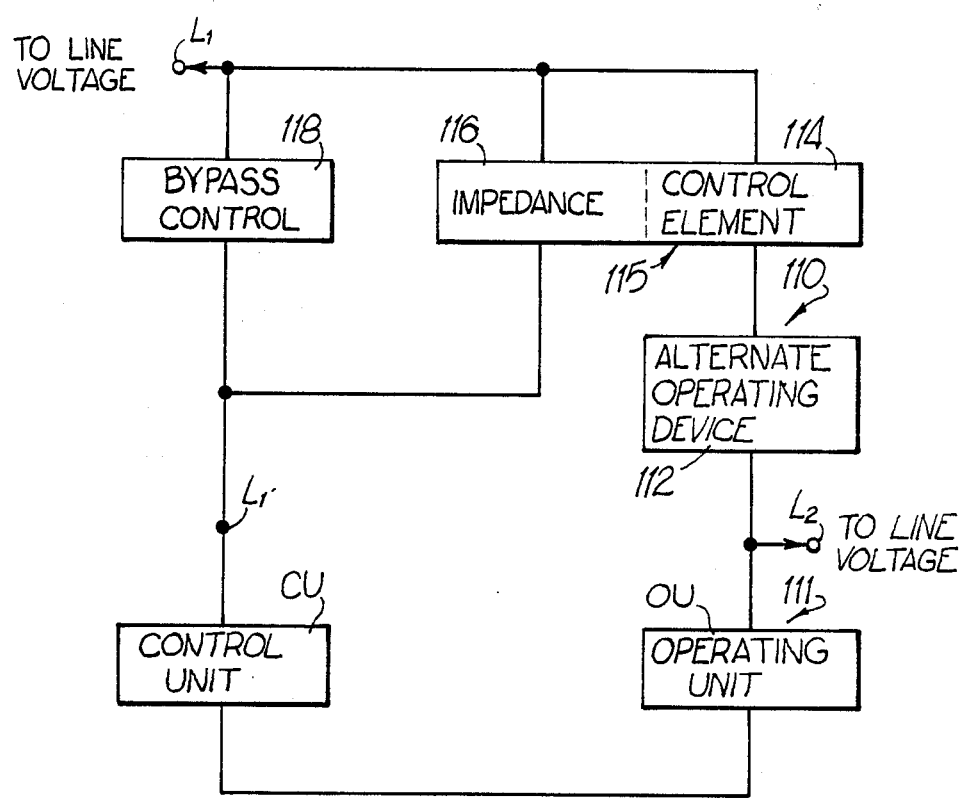
FIG. 2 is an electrical schematic diagram illustrating a more general version of a dual control thermostat circuit embodying the invention.

FIG. 2 illustrates a more general form of the control circuit of the invention applied to a more general form of an existing electrically powered device. The existing circuit has been designated in FIG. 2 by the numeral 111 while the control circuit has been designated 110. The existing circuit 111 has an operating unit OU connected between terminals $L_1'$ and $L_2$ through control unit CU. The operating unit OU may be any device which consumes electrical power in its operation and which will tolerate a very low current flow therethrough without operating and without damage. The control unit CU may be any type of device which is capable of connecting and disconnecting the operating unit OU to line voltage for operation. The control unit CU is typically a switching device which opens and closes in response to some change in external and internal condition such as temperature, pressure and the like.

The control circuit 110 includes an alternate operating device 112 which is connected to line voltage through the control element 114 of control device 115. The control device 115 includes a high impedance 116 which is connected in series with the units OU and CU to line voltage at terminal $L_2$. The value of the impedance 116 is selected sufficiently high to reduce the voltage drop/current level at the operating unit low enough to disable the operating unit OU. The control device 115 may be of any number of constructions and the impedance 116 and control element 114 need not be in the same device. For instance, impedance 116 may be a resistance and the control element 114 may be a silicon controlled rectifier operated from the voltage drop across the resistance. The bypass control unit 118 may be any device which can be used to selectively short out the impedance 116 so that the existing circuit 111 operates in its usual manner.

What is claimed as invention is:

1. A thermostatic control circut adapted to control the operation of both an existing electrically powered operating unit and an auxiliary operating unit where the existing operating unit is normally powered through a control unit connected in line voltage from an electrical power source to produce an electrical power output in response to a prescribed change in some control condition, said thermostatic control circuit comprising:

an impedance serially connecting said existing operating unit to the electrical power output on said control unit, said impedance having a sufficiently high impedance to reduce the current flow through said existing operating unit to a level to substantially prevent the operation thereof when said control unit provides line voltage at the electrical power output; and control means operatively associated with said impedance and responsive to line voltage applied to said impedance to connect said auxiliary operating unit to line voltage to operate same.

2. The circuit of claim 1 wherein said impedance is a relay coil.

3. The circuit of claim 2 wherein said control means is a set of normally open relay switch contacts operatively associated with said relay coil to close when line voltage is imposed across said relay coil.

4. The circuit of claim 1 further including bypass switch means connected to the electrical power output of said control unit in parallel with said impedance, said bypass switch means having a closed position effectively electrically shorting out said impedance to connect the existing operating and control units directly to line voltage when closed and having an open position so that the electrical power output on said control unit connects said existing operating unit to line voltage through said impedance.

5. The circuit of claim 1 wherein said existing operating unit is the conventional electric resistance heating elements in an electric hot water heater, wherein said control unit is the existing thermostatic switch network in the hot water heater, wherein said auxiliary operating circuit; wherein said impedance is a relay coil having a resistance such that the current flow through said resistance heating elements is so low that virtually no water is heated by said resistance heating elements; and wherein said control means includes a set of normally open relay switch contacts operatively associated with said relay coil which are closed by said relay coil when said relay coil is energized by closure of said existing thermostatic switch network to connect said operating circuit of said water heating heat pump to line voltage to operate same as long as said existing thermostatic switch network remains closed.

6. The circuit of claim 5 further including low temperature thermostatic switch means connected to the electrical power outlet of said control unit in parallel with said relay coil, said low temperature thermostatic switch means adapted to close when the environmental temperature around said water heating heat pump drops below a prescribed minimum value to effectively electrically short out said relay coil and disable said normally open relay switch contacts while connecting the existing resistance heating elements directly to line voltage through said thermostatic switch network as long as the environmental temperature around said heat pump remains below said prescribed minimum value.

7. The circuit of claim 6 further including a normally closed overload switch connected in series with said relay coil and operatively associated with said heat pump operating circuit to open in the event of an overload in said operating circuit and disconnect said relay coil from line voltage to disable both said normally open relay switch contacts and said resistance heating elements.

8. The circuit of claim 5 further including a manual override switch connected to the electrical power outlet of said control unit in parallel with said relay coil, said manual override switch adapted to be manually closed to effectively electrically short out said relay coil and disable said normally open relay switch contacts while connecting the existing resistance heating elements directly to line voltage through said thermostatic switch network as long as said manual override switch is closed.

9. The circuit of claim 7 further including a manual override switch connected to the electrical power outlet of said control unit in parallel with said relay coil, said manual override switch adapted to be manually closed to effectively electrically short out said relay coil and disable said normally open relay switch contacts while connecting the existing resistance heating elements directly to line voltage through said thermostatic switch network as long as said manual override switch is closed.

10. A method of disabling the resistance heating elements in the existing tank circuitry of an electric hot water heater equipped with a thermostatic switch network in the existing tank circuitry normally connecting the heating elements to line voltage comprising the steps of:

(a) disconnecting the line voltage from the thermostatic switch network in the existing tank circuitry; and (b) reconnecting the thermostatic switch network in the existing tank circuitry to line voltage through an impedance having a sufficiently high impedance value to reduce the current flow through the resistance heating elements to a level to substantially prevent the heating capability of the resistive heating elements when the thermostatic switch network is closed while creating a voltage drop across the impedance above a prescribed threshold value.

11. The method of claim 10 further comprising the step of:

connecting line voltage to an electric heat pump heating unit connected to the water heater as long as the voltage drop across the impedance exceeds said prescribed threshold value so that the heat pump heating unit heats the water in the hot water tank.

12. The method of claim 11 further comprising the step of alternatively connecting the thermostatic switch network in the existing tank circuitry to line voltage through a bypass switch in parallel with the impedance so that the thermostatic switch network in the tank circuitry is connected directly to line voltage when the bypass switch is closed.

13. The method of claim 12 further including the step of operatively associating the bypass switch with the heat pump heating unit so that the bypass switch is closed upon malfunction of the heat pump heating unit.

14. A method of connecting an electric hot water heater equipped with resistance heating elements and a thermostatic switch network to line voltage comprising the steps of:

(a) connecting the resistance heating elements and thermostatic switch network to line voltage through an impedance having a sufficiently high resistance value to reduce the current flow through the resistance heating elements to a level to substantially prevent the heating capability of the resistance heating elements when the thermostatic switch network is closed while creating a voltage drop across the impedance exceeding a prescribed threshold value; and (b) connecting line voltage to an electric heat pump heating unit connected to the water heater as long as the voltage drop across the impedance exceeds the prescribed threshold value so that the heat pump heating unit heats the water in the tank of the hot water heater.

15. The method of claim 14 further comprising the steps of connecting the resistance heating elements and thermostatic switch network in the existing tank circuitry to line voltage through a bypass switch in parallel with the impedance so that the existing tank circuitry is connected directly to line voltage when the bypass switch is closed.

16. The method of claim 15 further including the step of operatively associating the bypass switch with the heat pump heating unit so that the bypass switch is closed upon malfunction of the heat pump heating unit.

17. A thermostatic control circuit for connecting an electric hot water heater and an electric heat pump adapted to heat the water in the water heater to line voltage from a conventional electrical power source where the electric water heater includes a least one electric resistance heating element in series with a thermostatic switch network which opens and closes in response to water temperature in the hot water heater, said circuit including:

a relay including a relay coil and a set of normally open relay contacts which close when a prescribed threshold voltage is imposed across said relay coil, said relay coil adapted to be connected to line voltage in series with said heating element and said thermostatic switch network; said relay coil having a resistance value such that, when said thermostatic switch network closes to connect said electric resistance heating element to line voltage through said relay coil, the current flow through said heating element will be reduced to a level that the water in the water heater will not be significantly heated by said heating element and a voltage exceeding said prescribed threshold voltage will be imposed across said relay coil to close said set of contacts; and said set of relay contacts connecting said electric heat pump to line voltage when closed to operate said heat pump to heat the water in the water heater.

* * * * *